(12) United States Patent
Medithe et al.

(10) Patent No.: US 11,997,511 B2
(45) Date of Patent: May 28, 2024

(54) CELL OUTAGE COMPENSATION SYSTEM

(71) Applicant: RAKUTEN MOBILE, INC., Tokyo (JP)

(72) Inventors: Madhukiran Medithe, Tokyo (JP); Petrit Nahi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 197 days.

(21) Appl. No.: 17/523,856

(22) Filed: Nov. 10, 2021

(65) Prior Publication Data

US 2022/0264326 A1 Aug. 18, 2022

Related U.S. Application Data

(60) Provisional application No. 63/150,028, filed on Feb. 16, 2021.

(51) Int. Cl.
*H04W 24/02* (2009.01)
*H04W 16/24* (2009.01)

(52) U.S. Cl.
CPC ........... *H04W 24/02* (2013.01); *H04W 16/24* (2013.01)

(58) Field of Classification Search
CPC ..... H04W 24/02; H04W 16/24; H04W 16/06; H04W 16/28
See application file for complete search history.

(56) References Cited

U.S. PATENT DOCUMENTS

| | | | |
|---|---|---|---|
| 8,805,372 B2 | 8/2014 | Cook et al. | |
| 2010/0317354 A1 | 12/2010 | Kirvar | |
| 2011/0092195 A1* | 4/2011 | Hussein | H04W 24/02 455/418 |
| 2011/0130137 A1* | 6/2011 | Sanders | H01Q 1/246 455/446 |
| 2012/0184280 A1* | 7/2012 | Hunukumbure | H04W 24/02 455/446 |
| 2013/0005385 A1* | 1/2013 | Hunukumbure | H04W 16/22 455/507 |
| 2016/0277946 A1* | 9/2016 | Sofuoglu | H04W 28/18 |
| 2017/0317873 A1 | 11/2017 | Hevizi et al. | |
| 2019/0261197 A1* | 8/2019 | Bellamkonda | H04W 24/02 |
| 2019/0289515 A1* | 9/2019 | Tamura | H04W 36/0069 |
| 2020/0107239 A1* | 4/2020 | Singh | H04W 36/30 |
| 2022/0256358 A1* | 8/2022 | Tosyali | H04W 16/28 |

\* cited by examiner

*Primary Examiner* — Jae Y Lee
(74) *Attorney, Agent, or Firm* — HAUPTMAN HAM, LLP (57) ABSTRACT

A system includes a processor. The system also includes a memory connected to the processor, where the memory is configured to store executable instructions that, when executed by the processor, facilitate performance of operations, including: detecting an outage associated with devices of a cellular antenna, where the outage defines a cellular coverage hole; determining, in response to detecting the outage, one or more neighboring cellular antennas to the cellular antenna with the outage that are configured to provide coverage of the cellular coverage hole based upon a first criteria; determining for the neighboring cellular antennas satisfying the first criteria whether a second criteria is satisfied; and issuing an instruction, based on neighboring cellular antennas satisfying the second criteria, to up-tilt at least one of the one or more neighboring cellular antennas satisfying the second criteria.

20 Claims, 6 Drawing Sheets

Table 1

| Neighbor Cell | Mrs from Neighbor Cell to Serving Cell | InterSite Distance >0? | Azimuth | 90% tadist | 100% tadist | Intersection Area >0? | NBR Radio Availability Rate(%) | Norwise_Hosr | Interference from Neighbour | TA Bin(0-5) | TA Bin(5-100) | TA Bin(100-200) | TA Bin(200-500) | TA Bin(500-1000) | TA Bin(1000-2000) |
|---|---|---|---|---|---|---|---|---|---|---|---|---|---|---|---|
| NNA13010023_99_12 | 3 | 1066.501398 | 300 | 1900 | 5000 | 75 | 100 | 100 | 0.3 | 0 | 0 | 0 | 2 | 0 | 0 |
| NNA13010024_16_6 | 11 | 506.538067 | 180 | 500 | 3875 | 4 | 100 | 100 | 6.1 | 0 | 0 | 1 | 7 | 0 | 1 |
| NNA13010023_88_6 | 11 | 0 | 270 | 700 | 2375 | 0 | 82.88 | 95.949981 | 7.3 | 0 | 5 | 6 | 23 | 0 | 0 |
| NNA13010024_88_4 | 2 | 0 | 30 | 700 | 5000 | 16 | 48.7037 | 100 | 1.4 | 0 | 0 | 1 | 0 | 0 | 0 |
| NNA13010023_39_7 | 0 | 709.9142049 | 330 | 1000 | 5000 | 0 | 100 | 100 | 1.2 | 0 | 0 | 0 | 2 | 0 | 0 |
| NNA13010024_16_4 | 8 | 799.9142049 | 70 | 700 | 3000 | 0 | 100 | 100 | 1.3 | 0 | 0 | 0 | 2 | 0 | 0 |
| NNA13010024_14_3 | 1 | 685.5592521 | 320 | 1000 | 5000 | 0 | 100 | 95.238095 | 0.7 | 0 | 0 | 0 | 7 | 0 | 0 |
| NNA13010024_14_2 | 3 | 685.5592521 | 180 | 500 | 5000 | 0 | | | 0.06 | 0 | 0 | 0 | 2 | 0 | 0 |
| NNA13010024_14_1 | 22 | 685.5592521 | 60 | 500 | 3250 | 6 | 100 | 99.376947 | 8.07 | 0 | 0 | 19 | 93 | 0 | 1 |
| NNA13010023_79_6 | 0 | 1238.305784 | 310 | 100 | 500 | 0 | 100 | | | 0 | 0 | 0 | 0 | 0 | 0 |
| NNA13010024_15_3 | 0 | 1006.699358 | 260 | 300 | 700 | 0 | 100 | | 0.53 | 0 | 0 | 0 | 0 | 0 | 0 |

| Neighbor Cell | TA Bin(>2000) | Max_Distance_A_B | Mean_Dist_A_B | SRV NBR HOOUT EXEC ATTS | SRV NBR HOOUT PREP ATTS | SRV NBR HOOUT PREP SUCC | SRV NBR HOOUT EXEC SUCC | SRV NBR CORRECTION ACTION | SRV NBR TOO EARLY HO COUNT | SRV NBR TOO LATE HO COUNT | Interference_0-20 | Interference_20-40 | Interference_40-60 | Interference_40-80 | Interference_80-100 |
|---|---|---|---|---|---|---|---|---|---|---|---|---|---|---|---|
| NNA13010023_99_12 | 0 | 468 | 468 | 8 | 8 | 8 | 8 | 0 | 0 | 0 | 4 | 0 | 0 | 0 | 2 |
| NNA13010024_16_6 | 0 | 1248 | 468 | 188 | 188 | 188 | 188 | 0 | 0 | 0 | 55 | 32 | 16 | 17 | 19 |
| NNA13010023_88_6 | 0 | 390 | 232.6444 | 320 | 320 | 320 | 313 | 0 | 0 | 0 | 57 | 33 | 22 | 8 | 34 |
| NNA13010024_88_4 | 0 | 156 | 156 | 1 | 1 | 1 | 1 | 0 | 0 | 0 | 1 | 1 | 0 | 0 | 1 |
| NNA13010023_39_7 | 0 | 390 | 390 | 73 | 73 | 73 | 73 | 0 | 0 | 0 | 59 | 8 | 0 | 1 | 6 |
| NNA13010024_16_4 | 0 | 390 | 390 | 58 | 58 | 58 | 58 | 0 | 0 | 0 | 40 | 2 | 4 | 4 | 0 |
| NNA13010024_14_3 | 0 | 312 | 312 | 31 | 31 | 31 | 30 | 0 | 0 | 0 | 25 | 7 | 0 | 6 | 0 |
| NNA13010024_14_2 | 0 | 390 | 342.3333 | 0 | 0 | 0 | 0 | 0 | 0 | 0 | 9 | 0 | 0 | 0 | 0 |
| NNA13010024_14_1 | 0 | 468 | 276.1778 | 259 | 259 | 259 | 257 | 0 | 0 | 1 | 79 | 26 | 17 | 23 | 32 |
| NNA13010023_79_6 | 0 | 1248 | 1248 | 0 | 0 | 0 | 0 | 0 | 0 | 0 | 0 | 0 | 0 | 0 | 0 |
| NNA13010024_15_3 | 0 | 1248 | 1248 | 0 | 0 | 0 | 0 | 0 | 0 | 0 | 4 | 2 | 2 | 2 | 0 |

Fig. 6

CELL OUTAGE COMPENSATION SYSTEM

PRIORITY CLAIM AND CROSS-REFERENCE

This application claims priority to Provisional Application No. 63/150,028, filed Feb. 16, 2021, which is hereby incorporated by reference in its entirety.

BACKGROUND

A cellular network is a network of mobile devices (e.g., mobile phone devices) that communicate by radio waves through a local antenna at a cellular base station (e.g., cell tower). The coverage area in which service is provided is divided into small geographical areas called "cells". Each cell is served by a separate low power multichannel transceiver and antenna at the cell tower. All mobile devices within a cell communicate through that cell's antenna on multiple frequencies and on separate frequency channels assigned by the base station from a common pool of frequencies used by the cellular network.

The cellular network conserves radio bandwidth by frequency reuse. The low power radio signals used within each cell do not travel far beyond the cell coverage determined by the antenna tilt. Thus, the radio channels are able to be reused in the geographically separated cells. When a mobile device user moves from one cell to another, the mobile device is automatically "handed over" to the new cell's antenna and subsequently communicates with this antenna. This background handover process is transparent to the user and occurs in the middle of a mobile device call (or data download) without any service interruption. Each mobile device has an automated full duplex digital transceiver and communicates with the cell antenna over two digital radio channels in the UHF or microwave band, one digital radio channel for each direction of the bidirectional conversation, plus a control channel which handles registering the mobile device with the network, dialing, and the handover process.

In some instances, a cell tower (base station) is located at the edge of one or more cells and covers multiple cells using directional antennas. A common geometry is to locate the cell site at the intersection of three adjacent cells, with three antennas at 120° angles each covering one cell. The type of antenna used for cellular base stations, called a sector antenna, usually includes a vertical collinear array of dipoles. The sector antenna has a flat fan-shaped radiation pattern, which is tilted slightly down to cover the cell area without radiating at higher angles (i.e., to prevent interference with other cells) into further off cells that reuse the same frequencies. Interference is still an issue even if adjacent cells are using different frequencies if their radiation patterns overlap. The elevation angle of the antenna is carefully adjusted, so the beam covers the entire cell without radiating too far into an adjoining cell. In modern sector antennas beam tilt is usually adjusted electronically, to avoid a lineman climbing the tower to mechanically tilt the antenna when adjustment is needed.

BRIEF DESCRIPTION OF THE DRAWINGS

Aspects of the present disclosure are best understood from the following detailed description when read with the accompanying FIGS. It is noted that, in accordance with the standard practice in the industry, various features are not drawn to scale. In fact, the dimensions of the various features be arbitrarily increased or reduced for clarity of discussion.

FIG. 6 shows Table 1 detailing all the surrounding neighboring cells/antennas.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, be used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors used herein likewise be interpreted accordingly.

In at least one embodiment, a mobile device network (e.g., a cell network) provides and maintains mobile device coverage and capacity of the cell network services provided to users (e.g., end-users or subscribers). Additionally or alternatively, the cell network substantially reduces the time to restore a cell's availability after a cell outage (e.g., cell outages due to wear and tear of the network, environmental changes, or other technical aberrations). A system, in at least one embodiment, provides for recognition of the outage, identification of neighboring cells/antenna that are able to compensate (e.g., cover the cell outage or antenna outage) the outage zone (e.g., a coverage hole), and selection of neighboring cells/antenna that are up-tilted to compensate or cover the outage zone with minimal interference with other neighboring cells.

Due to many environmental and operational factors, maintaining cell network coverage for end users during an outage while also compensating for the coverage hole until the outage sites are restored to service is a significant challenge. The time to restoration for a cell ranges from an hour to a few days (e.g., in cases where a physical site visit is required). This significantly impacts the network connectivity and potentially causes subscriber dissatisfaction due to service unavailability or significantly degraded quality.

In at least one embodiment, a cell outage compensation algorithm uses a self-learning tool, such as artificial intelligence (AI) or machine learning (ML), to determine outage impact and to ensure a seamless network experience to users at the time of a cell outage. Additionally or alternatively, the cell outage compensation algorithm detects a cell outage, determines neighboring cells (e.g., antenna(s)) as candidates to compensate for a coverage hole, narrows the neighboring cells eligible for use in cell outage compensation based upon several performance metrics, and then narrows the eligible neighboring cells down further based upon handover key performance indicators (KPIs) and max distance coverage (i.e., to cover coverage hole). Access of the cell network by users is dynamic, ever-changing and also of concern in terms of the experience delivered. In at least one embodiment, a cell outage compensation algorithm is discussed that proactively compensates cell coverage loss during an outage. Additionally or alternatively, a cell outage compensation algorithm shapes radio signals from neighboring cells (e.g., antennas) to reach and maintain cell network coverage and capacity so the performance of the services in the cell network function seamlessly.

Figure 1:
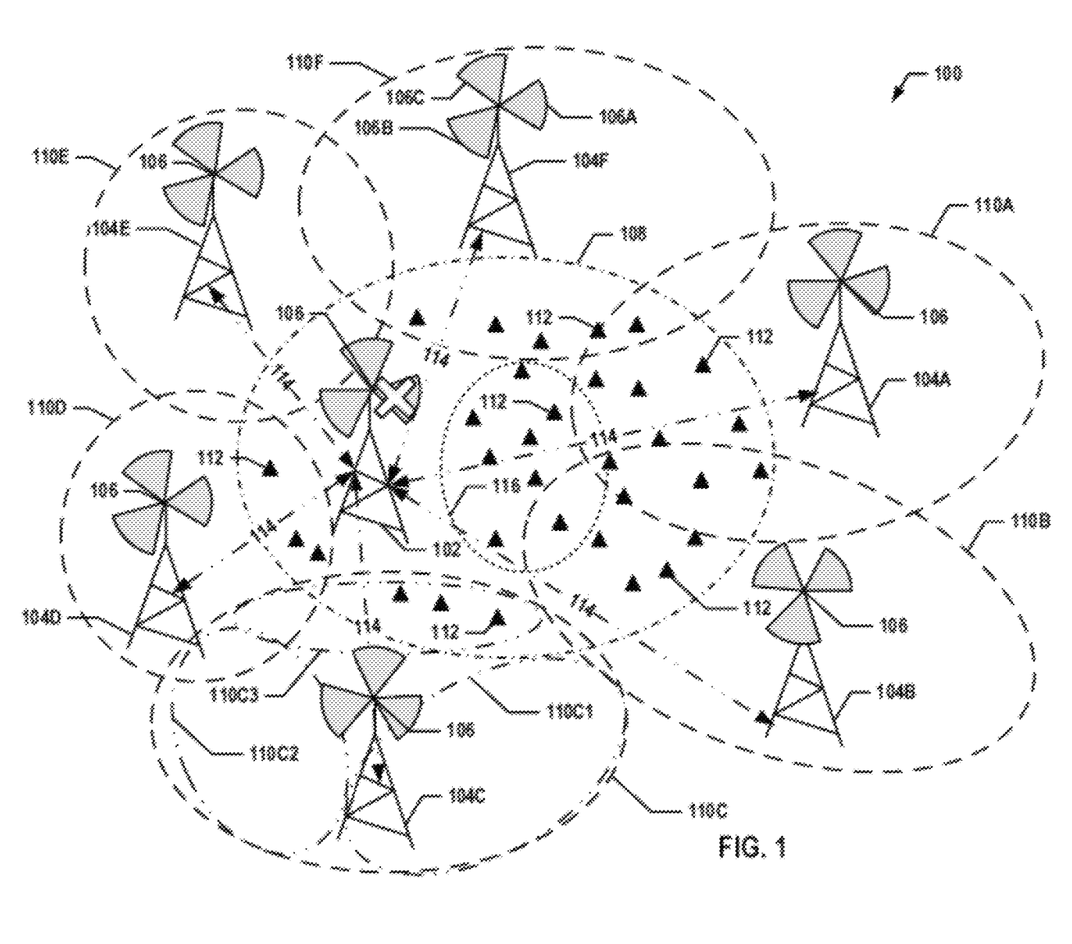
FIG. 1 is a diagrammatic representation of a cell network with a serving cell outage, in accordance with some embodiments.

FIG. 1 is a diagrammatic representation of a cell network with a serving cell outage, in accordance with some embodiments. In at least one embodiment, a cell network 100 comprises one or more cell towers (base stations) made up of a serving tower 102 (i.e., cell tower 102 is the tower designed to serve users 112 in coverage hole 116 at the time of the cell outage) and neighboring cell towers 104A, 104B, 104C, 104D, 104E and 104F (hereinafter referred to as neighboring cell towers 104). In at least one embodiment, each cell tower 102, 104 has one or more antennas 106A, 106B and 106C (hereinafter referred to as antennas 106) as shown in cell tower 104C. Additionally or alternatively, the geographical radio coverage of each antenna 106 makes up a cell. In at least one embodiment, cells (e.g., service area) 110C1, 110C2, and 110C3 are associated respectively with antennas 106A, 106B and 106C. The combination of the three cells from antenna(s) 106A, 106B and 106C on each cell tower 102, 104 are represented as one combined cell, including serving cell 108 and neighboring cells 110A, 110B, 110C, 110D, 110E and 110F (hereinafter referred to as neighboring cells 110) for cell towers 102, 104. Additionally or alternatively, cells 110C1, 110C2, and 110C3 are also neighboring cells within cell 110C. In at least one embodiment, cells 110C1, 110C2, and 110C3 represent the directionality of antenna 106A, 106B, and 106C. In at least one embodiment, combining each cell 110C1, 110C2, and 110C3 approximately represents cell 110C. The service area of each cell 108, 110 is represented with the dotted line surrounding cell towers 102, 104. However, in at least one embodiment, cells 108, 110A, 110B, 110D, 110E, and 110F each have one or more smaller cells within cells 108, 110A, 110B, 110D, 110E, and 110F representing each antenna 106.

Serving cell 108 has one or more users 112 that are actively, passively or about to enter the service area of serving cell 108. A distance 114 between serving cell 108 and each neighboring cells 110 is represented by dotted two-directional arrow. Additionally or alternatively, distance 114 is derived through measurements of the time elapsed for radio waves to travel from a mobile device to serving cell 108 and/or neighboring cells 110 (e.g., the timing advance (TA)) and is indicated by dotted arrow line.

In at least one embodiment, cell network 100 is a mobile device network where the communication is wireless. Cell network 100 is able to be a long term evolution (LTE), fifth generation (5G), non-standalone (NSA), standalone (SA), global system for mobile communications (GSM), a general packet radio service (GPRS), a code-division multiple access (CDMA), a Mobitex, an enhanced GPRS (EDGE) cellular network or the like. Additionally or alternatively, cell network 100 is distributed over a coverage area through cells 108, 110 where each cell 110 is served by at least one fixed-location transceiver, but more normally, three cell sites (e.g., antennas 106) or base transceiver stations. When joined together, cells 110 provide radio coverage over a wide geographic area (e.g., cells 108, 110). This enables numerous mobile devices (e.g., mobile phones, tablets and laptops equipped with mobile broadband modems, pagers, etc.) to communicate with each other and with fixed transceivers and telephones anywhere in cell network 100, via cell towers 102, 104, even if some of the mobile devices are moving through more than one cell 108, 110 during transmission. In at least one embodiment, a cell outage compensation algorithm detects this cell outage, determines neighboring cells (e.g., antenna(s) 106) as candidates to compensate for coverage hole 116, eliminates neighboring cells based upon several performance metrics, and then eliminates other neighboring cells further based upon handover key performance indicators (KPIs) and max distance coverage (i.e., to cover coverage hole 116).

In at least one embodiment, cell towers 102, 104 are able to be lattice or self-support towers, guyed towers, monopole towers, and concealed towers (e.g., towers designed to resemble trees, cacti, water towers, signs, light standards, and other types of structures). Additionally or alternatively, cell towers 102, 104 are a cellular-enabled mobile device site where antennas and electronic communications equipment are placed, typically on a radio mast, tower, or other raised structure to create a cell (or adjacent cells) in a cellular network. The raised structure typically supports antenna(s) 106 and one or more sets of transmitter/receivers transceivers, digital signal processors, control electronics, a GPS receiver for timing (e.g., for CDMA2000/IS-95 or GSM systems), primary and backup electrical power sources, and sheltering. Cell towers 102, 104 are known by other names such as base transceiver station, mobile phone mast, or base station. In at least one embodiment, serving tower 102 is like towers 104; however, for purposes of discussion, the term serving tower is used as cell tower 102 is serving users 112 affected by coverage hole 116.

In at least one embodiment, antenna(s) 106 are a sector antenna. Additionally or alternatively, antenna(s) 106 are a type of directional microwave antenna with a sector-shaped radiation pattern. In at least one embodiment, the sector degrees of arc is 60°, 90° or 120° designs with a few degrees extra to ensure overlap. Further, sector antennas are mounted in multiples when wider coverage or a full-circle coverage is desired. In at least one embodiment, antenna(s) 106 are a rectangular antenna, sometimes called a panel antenna or radio antenna, used to transmit and receive waves or data between mobile devices or other devices and a cell tower. Additionally or alternatively, antenna(s) 106 are circular antennas. In at least one embodiment, antenna 106 operates at microwave or ultra-high frequency (UHF) frequencies. In other examples, antenna(s) 106 are chosen for their size and directional properties.

In at least one embodiment, cell 108, 110 comes in most any shape and size. In at least one embodiment, cells 108, 110 are a maco-cell (covering 1 Km-30 Km), a micro-cell (covering 200 m-2 Km), or a pico-cell (covering 4 m-200 m). In at least one embodiment, cell 110 is circular, oval or sector in shape, but cell 110 is able to have most any shape or size as antenna 106 has directional capabilities. As discussed above and in at least one embodiment, cell 110 has a circular or oval shape that is a representation of a combination of multiple oval, circular or sector cell shapes from each of antenna. In this at least one embodiment, cell 110 shows a cellular coverage area of the antenna cells that are part of each tower 104.

In at least one embodiment, coverage holes are caused by most anything such as faulty equipment, bad weather, animals, accidents and the like. Coverage holes occur through the loss of one or more sets of transmitter/receivers transceivers, digital signal processors, control electronics, GPS receivers, primary and backup electrical power sources, and antennas. Additionally or alternatively, coverage holes exist because of areas never previously covered by cellular service or created by removal of a cell tower or the like. In some embodiments, coverage holes develop after the service covering an area is lost for any reason. In other examples, a coverage hole is any area without any cell coverage service to user 112 for whatever reason.

In at least one embodiment, serving tower 102 has an antenna 106A (indicated with an X overtop of antenna 106A) that has had an outage for any number of reasons. The outage of antenna 106A has created a coverage hole 116 (indicated with a dotted line) where several users 112 (e.g., represented as several triangles throughout FIGS. 1 & 2) within coverage hole 116 are left without cell service and without any cell coverage. This loss of service leads to user dissatisfaction. In at least one embodiment, the loss of antenna 106A is discussed; however, several other malfunctioning devices (such as one or more sets of transmitter/receivers transceivers, digital signal processors, control electronics, GPS receivers, connectivity loss of mid-haul, front-haul and back-haul, and primary and backup electrical power sources in support of antenna(s) 106) are able to cause cell coverage disruption as well. In at least one embodiment, coverage hole 116 now occupies an area formerly covered by a cell extending outward from cell tower 102 toward neighboring cell towers 104A, 104B and 104F.

In at least one embodiment, a network user-centric approach minimizes the impact of the loss of cell antenna 106A of serving tower 102 or even entire cell tower 104 outages of one or more cell towers 102, 104. Additionally or alternatively, a cell antenna outage algorithm is based on learned user behavior, existing available network resources for compensation while providing interference management and maintaining quality. In at least one embodiment, the compensation of outages is based on up-tilting antenna(s) 106 of cell tower(s) 104 neighboring (e.g., surrounding or in the vicinity of) serving tower 102 with an outage or multiple outages (e.g., one or more antenna 106).

In at least one embodiment, cell network operation is in accord with the following technical specifications 3GPP TS 36.211, 3GPP TS 36.213, 3GPP TS 36.331, 3GPP TS32.541, 3GPP TS 36.413, 3GPP TS 28.861, 3GPP TS 36.902, and 3GPP TS 24.301 all of which are herein incorporated by reference in their entireties.

In at least one embodiment, a system, comprising a processor (see FIG. 5) and a memory (see FIG. 5) that stores executable instructions, such as a cell antenna outage algorithm that, when executed by the processor, facilitates performance of cell outage compensation operations. The system processor determines a coverage hole 116 exists when an event of an outage associated with devices (e.g., antenna 106 or any supporting infrastructure of cell tower 102 that causes an outage) of serving tower 102 is detected (e.g., such as an alarm indicating a malfunctioning piece of equipment). In at least one embodiment, antenna 106A of serving tower 102 is shown as failing and creating coverage hole 116. As a result of this outage, several users 112, who are within coverage hole 116, are without cellular service. Additionally or alternatively, not one of the neighboring cells 110 cover coverage hole 116 at the time of the outage as shown by existing cells 110. This disruption of service causes user dissatisfaction.

In the event of an outage or network service disruption users 112 who are actively connected to cell network 100, those who are idle at the time of outage, and those entering coverage hole 116 of serving cell 102 are impacted. In at least one embodiment, a cell antenna outage algorithm provides connectivity to users 112 by maintaining the cell coverage and network capacity through dynamic adjustment of the radio coverage of neighboring antenna(s) 106 with minimal interference with other neighboring cells 110.

In at least one embodiment, when an outage alarm is detected in cell network 100, user coverage experience is observed, through the use of user measurement reports and other performance metrics, during three phases: (1) before the outage, (2) during the outage, and after the outage to provide the best metrics on user satisfaction. Additionally or alternatively, performance indicators are used for the cell outage algorithm to identify all eligible neighboring cells 110. The eligible neighboring cells 110 are filtered again based upon performance metrics. The filtered eligible neighboring cells 110 are filtered a second time to find antenna(s) 106 eligible to be up-tilted to cover coverage hole 116 with minimal interference, maximum distance coverage and users 112 served. In at least one embodiment, the cell outage compensation algorithm uses several variables to discover neighboring cells 110, filter the neighboring cells 110 based upon antenna performance metrics, and then select one or more antenna(s) to up-tilt to cover coverage hole 116 based on maximum coverage, users served and handover metrics.

In at least one embodiment, a cell outage compensation algorithm determines, in response to the detected outage, if one or more neighboring antenna(s) 106 possibly configured to provide compensation for coverage hole 116 based upon a first criteria. Additionally or alternatively, the first criteria are grouped into four categories: (1) mobility: user equipment (UE) measurement reports (MR) that keep track of different signal strength measurements and quality of signal between the user's device and antenna 106 and reports if certain conditions are not met; handover stats regarding the process of transferring an ongoing call or data session from one cell 110 to another; neighbor relation table (NRT) (i.e., the list of E-UTRAN node B (eNB) neighbors and controlled by automatic neighbor relations (ANR)); measurement reports (MR) containing information about channel quality for the purposes of allocation of radio resources; (2) channel quality: multi-cell interference contribution that is the interference caused by adjoining cells interfering with one another, (3) coverage: neighboring cell statistics, and (4) user activity (i.e., the number of measurement reports signifying how many users are on the cell 110).

In at least one embodiment, the cell outage compensation algorithm considers various parameters of historical data, continuously calculated for every cell, for learning dynamic thresholds in the decision making process or determination of compensation actions. Additionally or alternatively, in a first phase a first set of criteria are evaluated to determine whether any of neighboring cells 110/antenna(s) 106 are eligible to be used to compensate for coverage hole 116. In at least one example, a criteria is selecting neighbor cells 110 reported in MRs in both directions pairwise. In another example, a criteria is choosing neighbor cells 110 having a minimum number of MRs (e.g., from one or more), handover success rate and degree of interference. In another example, neighbor cells 110/antenna(s) 106 are chosen if an intersite distance greater than zero (e.g., to prevent antenna(s) 106 of the same cell 108 from compensation and increasing the chances for interference). In another example, neighbor cells 110 are chosen having an intersection distance 114 greater than zero to find antennas 106 capable of extending their coverage distance with minimal interference to compensate for coverage hole 116. The cell outage compensation algorithm eliminates any neighboring cells 110 that do not satisfy any of the first criteria. For those neighboring cells 110 that satisfy the first criteria, the cell outage compensation algorithm implements a second criteria.

In at least one embodiment, the cell outage compensation algorithm determines, in response to there being one or more first criteria cellular antennas 106, if first criteria cellular antennas 106 are configured to provide coverage of coverage hole 116 based upon a second criteria. Additionally or alternatively, of neighboring cells 110/antenna(s) 106 that satisfy the first criteria, in a second phase a second set of criteria are evaluated to determine whether any of neighboring antenna(s) 106 are configured to be up-tilted to provide coverage to coverage hole 116. In at least one embodiment, antenna(s) 106 to be up tilted are selected based on the TA max and min distance 114 calculated in both directions (e.g., TA samples are processed with a cumulative distribution function (CDF) to determine a min and max distance based upon the samples). Antenna(s) 106 covering the max distance of the TA samples and having a sizeable number of users served (e.g., MRs showing from one or more users) are chosen. In at least another embodiment, antenna(s) 106 are chosen based on too-late and too early mobility robustness optimization (MRO) key performance indicators (KPIs) with the highest values being used for up-tilting.

In at least one embodiment, the cell outage compensation algorithm reduces the degradation caused by a weakened coverage due to faults occurring in the network. Additionally or alternatively, the cell outage compensation algorithm provides derivation of insights enabling automatic selection of neighboring cells 110/antenna(s) 106 to carry out the compensation and a complementing automatic configuration to adapt to different scenario conditions.

In at least one embodiment, when the cell outage compensation algorithm has selected antenna(s) 106 to be up-tilted, an instruction is issued to up-tilt at least one of antenna(s) 106 satisfying the second criteria. Additionally or alternatively, the instruction to up-tilt antenna(s) 106 satisfying the second criteria is an initial two-step up-tilt (e.g., up-tilting antenna 106 two degrees). In another embodiment, the cell outage compensation algorithm fine tunes the up-tilt by issuing additional instructions to continue up-tilting antenna(s) 106 satisfying the second criteria up to a configured interference tolerance (e.g., multi-cell interference (MCI) ratio of from 5 and above). The cell outage compensation algorithm also issues instructions, based on serving cell 108 becoming operational again, to down-tilt antenna(s) 106 satisfying the second criteria to original tilt values.

Up-tilting (beam tilt) is used in radio to aim the main lobe of the vertical plane radiation pattern of an antenna below (or above) the horizontal plane. In some embodiments, up-tilting occurs through electrical beam tilt, where the phasing between antenna elements is tweaked to make the radio signal go up or down. In some embodiments, mechanical tilt is controlled using remote actuators and position sensors, thus reducing operating expenses. Remote electrical tilt is abbreviated as RET and it is part of the Antenna Interface Standards Group's open specification for the control interface of antenna devices and is hereby incorporated by reference in its entirety. In some embodiments, mechanical and electrical tilt are used together in order to create greater beam tilt in one direction than the other.

Figure 2:
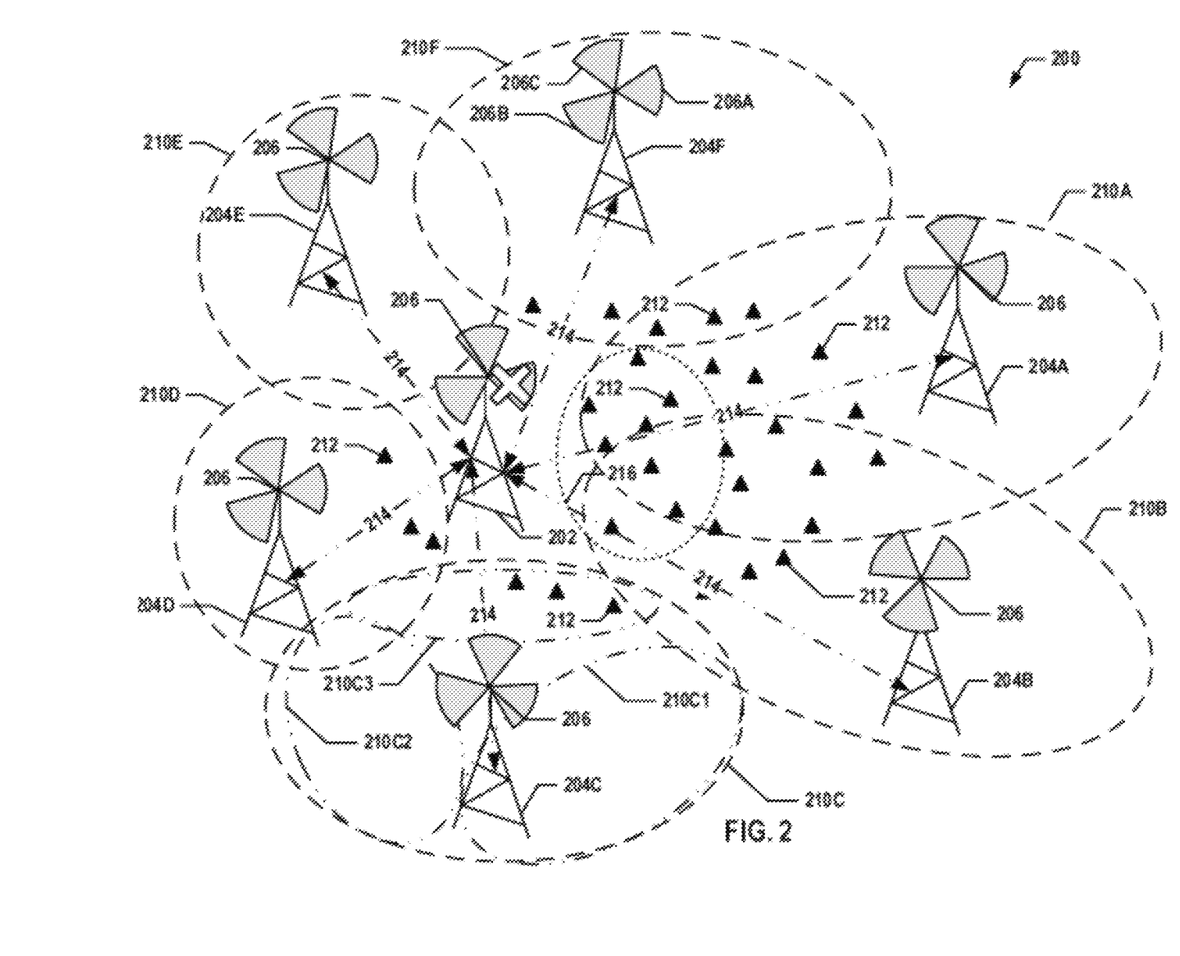
FIG. 2 is a diagrammatic representation of neighboring cells providing compensation coverage for a serving cell outage, in accordance with some embodiments.

FIG. 2 is a diagrammatic representation of neighboring cells providing compensation coverage for a serving cell outage, in accordance with some embodiments. In at least one embodiment, a cell network 200 comprises one or more cell towers made up of a serving cell tower 202 and neighboring cell towers 204A, 204B, 204C, 204D, 204E and 204F (hereinafter referred to as neighboring cell towers 204). Additionally or alternatively, cell network 200, serving tower 202 and neighboring cell tower 204 are like cell network 100, serving cell tower 102 and neighboring cell tower 104.

In at least one embodiment, each cell tower 202, 204 has one or more antennas 206A, 206B and 206C (hereinafter referred to as antennas 206) as shown in cell tower 204C. Additionally or alternatively, the geographical radio coverage of each antenna 206 makes up a cell. Additionally or alternatively, antennas 206A, 206B, and 206C are like antennas 106A, 106B and 106C. Additionally, neighboring cells 210A, 210B, 210C, 210D, 210E and 210F are like neighboring cells 110A, 110B, 110C, 110D, 110E and 110F.

The coverage hole 216 has been compensated for by neighboring cells 210A and 210B. As discussed in more detail below, in at least one embodiment, antenna 206B of cell 210A and antenna 206C of cell 210B have been up-tilted. The up-tilting has expanded cells 210A and 210B to cover all users 212 who were left without service when antenna 206A of serving tower 202 went out of service.

In at least one embodiment, a non-transitory computer-readable storage medium (see FIG. 5), comprising executable instructions, such as the cell outage compensation algorithm, when executed by a processor (see FIG. 5), facilitate performance of compensating for a coverage hole 216. In at least one embodiment, the processor detects a service outage at serving cellular antenna 206A that created cellular coverage hole 216. Additionally or alternatively, the processor determined, in response to the service outage, one or more neighboring cellular antennas 206 to serving cellular antenna 206A that are capable of providing cellular coverage for at least a portion of cellular coverage hole 216 while minimizing interference, maximizing users served and optimizing handovers. In at least one embodiment, the processor issues instructions, to one or more neighboring cellular antenna(s) 206 determined capable of providing cellular coverage to cellular coverage hole 216 with minimal interference, to up-tilt one or more neighboring cellular antenna(s) 206 determined capable of providing cellular coverage to coverage hole 116. In at least one embodiment, the antenna up-tilted are antenna 206B of cell tower 204A and antenna 206C of cell tower 204B.

In at least one embodiment, minimizing interference is determined through the multi-cell interference management MCIM ratio. In at least one embodiment, the processor determines one or more neighboring cellular antenna(s) 206 that have a minimum number of MRs (e.g., more than 1), a minimum handover success rate (HOSR) (e.g., from 99 and greater) and a minimum multi-cell interference (MCI) (e.g., from 5 and greater). In at least one embodiment, the processor determines if one or more neighboring cellular antenna(s) 206 have an intersite distance greater than zero. This ensures another antenna 206 from the same affected cell tower 202 is not considered for any up-tilting. Up-tilting of antenna from the affected cell tower 202 would cause substantial interference due to the size of the cell necessary to cover outage hole 216. In at least one embodiment, the processor determines if one or more neighboring cellular antenna(s) 206 have an intersection distance greater than zero. An intersection distance greater than zero ensures there is room for cells 210 to enlarge without causing significant interference. Thus, if this distance between cells is zero, then there is less area for a neighboring cell 210 to expand than if there was a large amount of distance between the serving cell and the neighboring cell. Additionally or alternatively, an intersection distance greater than zero further ensures the avoidance of selection a co-located antenna. The greater the distance between the two, the less risk of cell interference. In at least one embodiment, minimizing interference is determined through a maximum antenna coverage distance of one or more neighboring cellular antenna(s) 206. In at least one embodiment, the processor determines one or more neighboring cellular antenna(s) 206 that have a minimum value for mobility robustness optimization (MRO) to ensure handover procedures with other neighboring cells 210 occur properly. Additionally or alternatively, the choice of antennas 206 to be up-tilted is also based on the number of users served. Therefore, the higher MR number for the antenna, then the greater number of users served.

In some embodiments, operations do not necessarily need to occur as discussed in the embodiments unless specifically stated. In at least one embodiment, operations in the cell outage compensation algorithm are able to occur in any order and not all processes are required.

Figure 3:
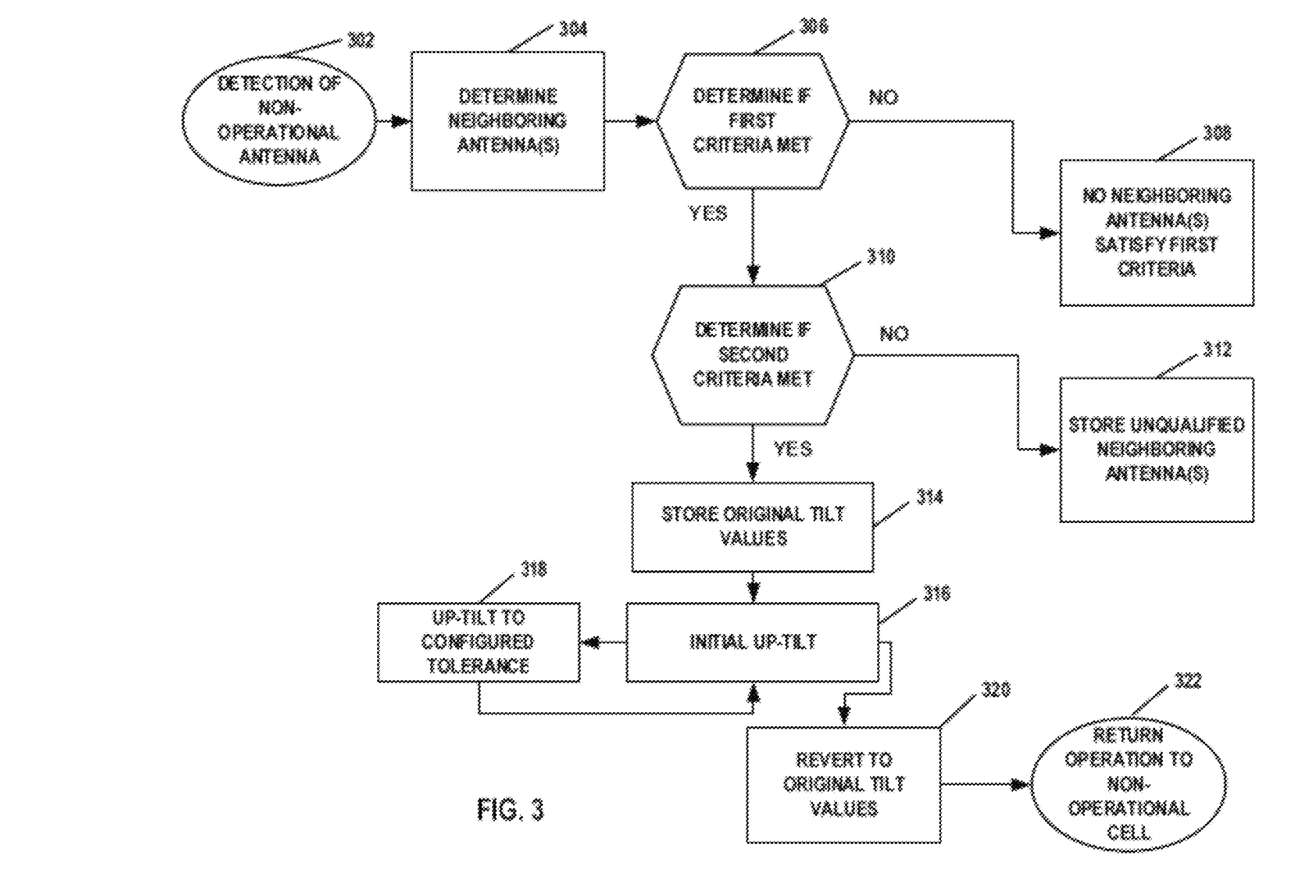
FIG. 3 is a flow diagram representation of a method of providing cell outage compensation coverage, in accordance with some embodiments.

FIG. 3 is a flow diagram representation of a method of providing cell outage compensation coverage, in accordance with some embodiments. In at least one embodiment, a system (see FIG. 5) comprising a processor (see FIG. 5) executing a cell outage compensation algorithm stored on memory (see FIG. 5) detects a non-operational serving cellular antenna (302). For instance, an outage alarm is initiated on the detection of any non-operational equipment affecting any antenna that creates an outage hole.

In at least one embodiment, in response to the non-operational serving cellular antenna being detected, the processor determines one or more neighboring cellular antennas configured to provide coverage of the coverage hole caused by the non-operational serving cellular antenna (304). For instance, with reference to Table 1 below and in at least one embodiment, the processor determines one or more neighboring cells/antennas in the surrounding area. In at least one embodiment, the processor keeps a continuously updated table (e.g., like the one below) detailing all the surrounding neighboring cells/antennas. In at least one embodiment, column 1 of Table 1 shows there are 11 neighboring cells/antennas.

In at least one embodiment, the processor determines, in response to there being one or more neighboring cellular antennas, the one or more neighboring cellular antennas satisfy one or more minimum requirements (306). For instance, the processor, in at least one embodiment, determines if the neighboring cells/antenna(s) would cover the coverage hole created by the outage cell. In at least one embodiment, this is handled in a first phase where a first criteria is applied to all of the neighboring antenna/cells. If no neighboring cells/antenna(s) satisfy the first criteria to cover the coverage hole ("No" branch of block 306), then the processor determines not one of the neighboring cells/antenna(s) are able to cover the coverage hole (308). If one or more neighboring cells/antenna(s) satisfy the first criteria to cover the coverage hole ("YES" branch of block 306), then the processor determines if these first criteria neighboring cells/antenna(s) satisfy a second quality criteria (310).

In at least one embodiment, if the second quality criteria is not met ("NO" branch of block 310), the unqualified neighboring cells/antenna(s) are stored along with a score based upon the criteria for disqualifying the neighboring cells/antenna(s) (312). In at least one embodiment, if the second quality criteria is met ("YES" branch of block 310), original tilt values of the antenna satisfying the second quality criteria are stored (314). In at least one embodiment, an initial up-tilt of the selected neighboring cells/antenna(s) is initiated by the processor (316). In at least one embodiment, the processor initiates a closed loop process where the selected neighboring cells/antenna(s) are continuously up-tilted to meet a configured interference tolerance between neighboring cells/antenna(s) (318).

In at least one embodiment, when the outage equipment is back online or has been repaired, the processor initiates an instruction for the selected neighboring cells/antenna(s) to return to their original stored tilt values (320). In at least one embodiment, the processor initiates an instruction to the formerly non-operational antenna or to a replacement antenna, to begin operation once the selected neighboring cells/antenna(s) are returned to their original stored tilt values to prevent any cell interference (322).

Figure 4:
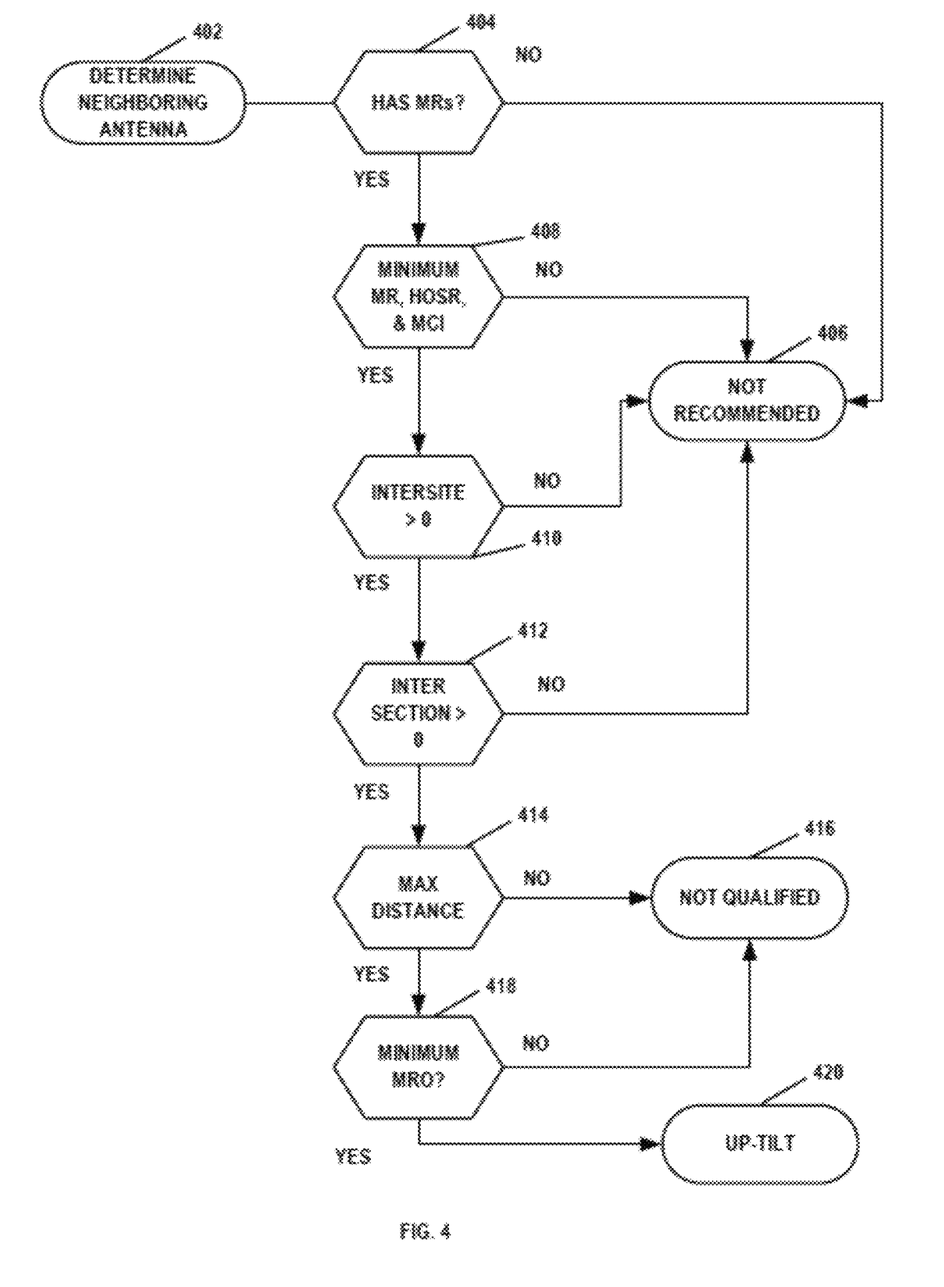
FIG. 4 is a flow diagram representation of a method of determining a first and a second criteria for selecting a neighboring cellular antenna to cover an outage area, in accordance with some embodiments.

FIG. 4 is a flow diagram representation of a method of determining a first and a second criteria for selecting a neighboring cellular antenna to cover an outage area, in accordance with some embodiments. In at least one embodiment, a processor (see FIG. 5) implementing a cell outage compensation algorithm stored in a memory (see FIG. 5) begins at determining all neighboring cells/antenna(s) surrounding an outage cell (402). For instance, with reference to Table 1 600 in FIG. 6, in at least one embodiment, column 1 of Table 1 600 in FIG. 6 shows 11 neighboring cells/antennas available.

In at least one embodiment, each neighboring cell/antenna is examined in phase one to determine if a first criteria is met. In at least one embodiment, the minimum requirements comprise the processor determining the one or more neighboring cells/antenna report measurement reports (MR) in both directions between the serving cellular antenna and the one or more neighboring cellular antennas (404). With reference to Table 1 600 in FIG. 6, there are three antennas which have zero MRs ("NO" branch of block 404). These three neighboring antennas will not satisfy the first criteria and are not recommended (406). A neighboring cell/antenna with zero MRs means there is zero shared users between the serving cell and the neighboring cell.

In at least one embodiment, the remaining neighboring cells/antenna(s) are evaluated by the processor to determine the one or more neighboring cellular antennas have a minimum number of MR, a minimum handover success rate (HOSR) and a minimum multi-cell interference (MCI) ("YES" branch of block 404) (408). Referring again to Table 1 600 in FIG. 6 in at least one embodiment, the remaining eight antennas all have a minimum of 1 MR and so those eight antennas are eligible to move forward for evaluation.

However, out of these eight antennas, only six antennas meet the minimum HOSR (e.g., from 99% and greater hand over success rate) and thus 2 more antennas are eliminated ("NO" branch of block 408). In at least one embodiment, each cell has overlap with nearby cells. This overlap is shown in the interference from neighbor and the minimum value for this metric is five. From the table and the example of at least one embodiment, only two antenna satisfy this metric and move forward to the next criteria ("YES" branch or block 408) (406).

In at least one embodiment, the processor then determines if the one or more neighboring cellular antennas have an intersite distance greater than zero ("YES" branch of block 408) (410). For instance, having an intersite distance greater than zero ensures an antenna being selected is not form the same tower, which potentially causes significant issues with interference. Therefore, any antenna having an intersite distance greater than zero is still an eligible up-tilt antenna and those with distances of zero are eliminated ("NO" branch of block 410) (406). In at least one embodiment, Table 1 600 in FIG. 6 shows there were two antenna with a zero intersite distance. These two antenna are possibly the other two antenna of the group of three of the cell tower suffering the outage. In at least one embodiment, the processor determines if the one or more neighboring cellular antennas have an intersection distance greater than zero ("YES" branch of block 410) (412). In at least one embodiment, having an intersection distance greater than zero ensures the antenna/neighboring cell have some distance between the cells. From Table 1 600 in FIG. 6, several antennas/neighboring cells with the serving antenna have very little distance between them and thus the intersection distance was not greater than zero and those antenna would not be recommended ("NO" branch of block 412) (406).

In at least one embodiment, the processor moves into a second phase to a second set of criteria for the antenna determined to be eligible for compensating a coverage hole according to the criteria of the first phase. The processor determines the one or more neighboring cellular antennas cover a maximum antenna coverage distance ("YES" branch of block 412) (414). If the remaining cells/antenna do not have a large enough TA max antenna coverage distance, the remaining cells/antenna are ruled out and stored as not qualified ("NO" branch of block 414) (416). If the antenna/neighboring cells have a large enough max distance, then the processor determines if the one or more neighboring cellular antennas have a minimum value for mobility robustness optimization (MRO) ("YES" branch of 414) (418). If a minimum MRO does not exist, then the antenna/neighboring cell is not eligible and not qualified ("NO" branch of block 418) (416). If a minimum MRO does exist, then the antenna/neighboring cell is qualified and is selected as an eligible antenna to be up-tilted ("YES" branch of block 418) (420).

Figure 5:
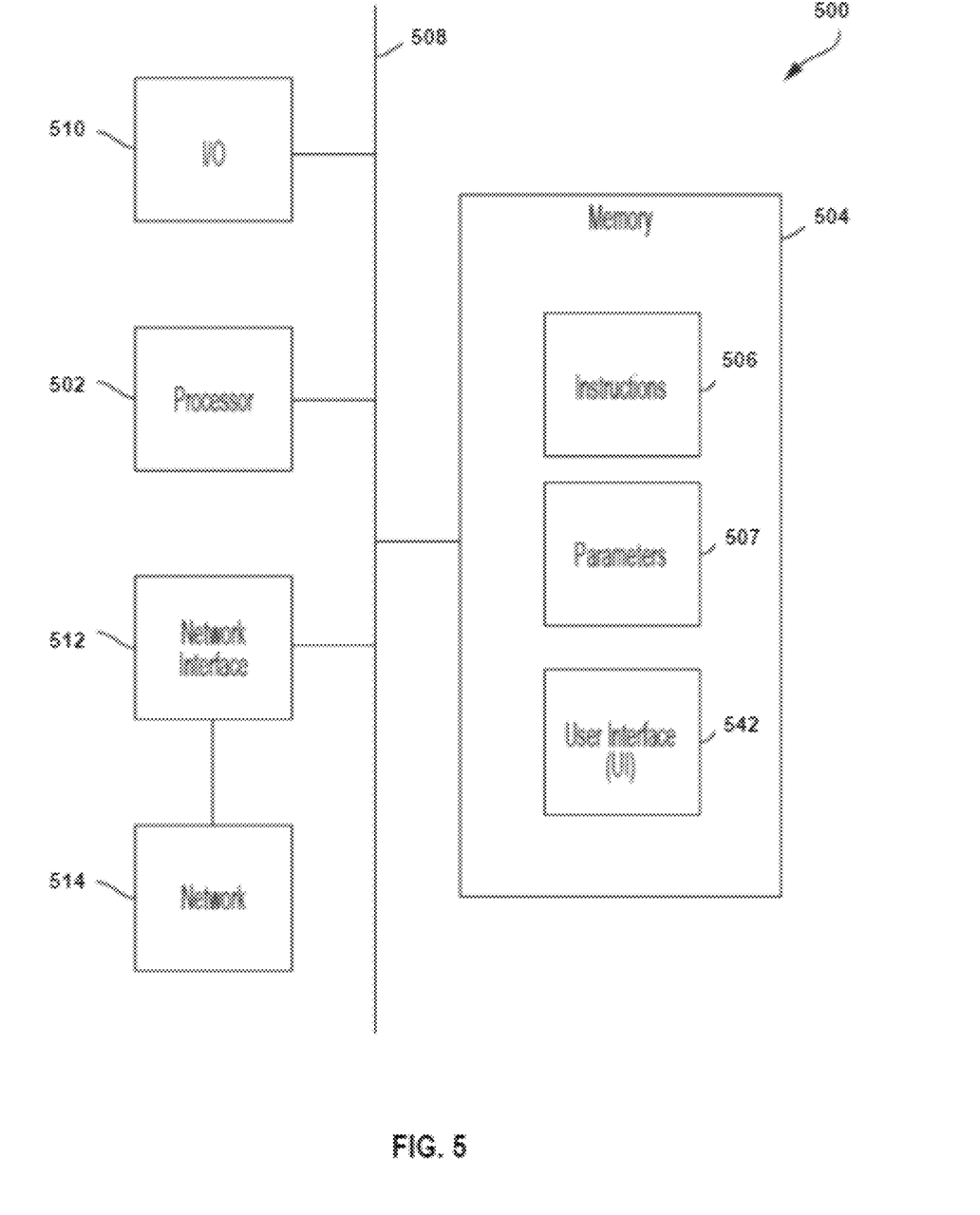
FIG. 5 is a high-level functional block diagram of a processor-based system, in accordance with some embodiments.

FIG. 5 is a block diagram of a cell outage compensation processing circuitry 500 in accordance with some embodiments. In some embodiments, cell outage compensation processing circuitry 500 is a general purpose computing device including a hardware processor 502 and a non-transitory, computer-readable storage medium 504. Storage medium 504, amongst other things, is encoded with, i.e., stores, computer program code 506, i.e., a set of executable instructions such as cell antenna outage compensation algorithm. Execution of instructions 506 by hardware processor 502 represents (at least in part) a neighboring cell/antenna discovery tool which implements a portion or all of the methods described herein in accordance with one or more embodiments (hereinafter, the noted processes and/or methods).

Processor 502 is electrically coupled to a computer-readable storage medium 504 via a bus 508. Processor 502 is also be electrically coupled to an I/O 1 interface 510 by bus 508. A network interface 512 is also electrically connected to processor 502 via bus 508. Network interface 512 is connected to a network 514, so that processor 502 and computer-readable storage medium 504 are capable of connecting to external elements via network 514. Processor 502 is configured to execute computer program code 506 encoded in computer-readable storage medium 504 in order to cause coverage hold cell outage compensation processing circuitry 500 to be usable for performing a portion or all of the noted processes and/or methods. In one or more embodiments, processor 502 is a central processing unit (CPU), a multi-processor, a distributed processing system, an application specific integrated circuit (ASIC), and/or a suitable processing unit.

In one or more embodiments, computer-readable storage medium 504 is an electronic, magnetic, optical, electromagnetic, infrared, and/or a semiconductor system (or apparatus or device). For example, computer-readable storage medium 504 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 504 includes a compact disk-read only memory (CD-ROM), a compact disk-read/write (CD-R/W), and/or a digital video disc (DVD).

In one or more embodiments, storage medium 504 stores computer program code 506 configured to cause cell outage compensation processing circuitry 500 to be usable for performing a portion or all of the noted processes and/or methods. In one or more embodiments, storage medium 504 also stores information, such as cell outage compensation algorithm which facilitates performing a portion or all of the noted processes and/or methods. In one or more embodiments, storage medium 504 stores parameters 507.

Cell outage compensation processing circuitry 500 includes I/O interface 510. I/O interface 510 is coupled to external circuitry. In one or more embodiments, I/O interface 510 includes a keyboard, keypad, mouse, trackball, trackpad, touchscreen, and/or cursor direction keys for communicating information and commands to processor 502.

Cell outage compensation processing circuitry 500 is also include network interface 512 coupled to processor 502. Network interface 512 allows cell outage compensation processing circuitry 500 to communicate with network 514, to which one or more other computer systems are connected. Network interface 512 includes wireless network interfaces such as BLUETOOTH, WIFI, WIMAX, GPRS, or WCDMA; or wired network interfaces such as ETHERNET, USB, or IEEE-864. In one or more embodiments, a portion or all of noted processes and/or methods, is implemented in two or more cell outage compensation processing circuitry 500.

Cell outage compensation processing circuitry 500 is configured to receive information through I/O interface 510. The information received through I/O interface 510 includes one or more of instructions, data, design rules, libraries of standard cells, and/or other parameters for processing by processor 502. The information is transferred to processor 502 via bus 508. Cell outage compensation processing circuitry 500 is configured to receive information related to a UI through I/O interface 510. The information is stored in computer-readable medium 504 as user interface (UI) 542.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

A system of one or more computers are configured to perform particular operations or actions by virtue of having software, firmware, hardware, or a combination of them installed on the system that in operation causes or cause the system to perform the actions. One or more computer programs are configured to perform particular operations or actions by virtue of including instructions that, when executed by data processing apparatus, cause the apparatus to perform the actions. In some embodiments, a system includes a processor. The system also includes a memory connected to the processor, where the memory is configured to store executable instructions that, when executed by the processor, facilitate performance of operations, including: detecting an outage associated with devices of a cellular antenna, where the outage defines a cellular coverage hole; determining, in response to detecting the outage, one or more neighboring cellular antennas to the cellular antenna with the outage that are configured to provide coverage of the cellular coverage hole based upon a first criteria; determining for the neighboring cellular antennas satisfying the first criteria whether a second criteria is satisfied; and issuing an instruction, based on neighboring cellular antennas satisfying the second criteria, to up-tilt at least one of the one or more neighboring cellular antennas satisfying the second criteria. Other embodiments of this aspect include corresponding computer systems, apparatus, and computer programs recorded on one or more computer storage devices, each configured to perform the actions of the methods.

Some implementations include one or more of the following features. The system where the first criteria includes determining whether the one or more neighboring cellular antennas have at least one measurement report (MR) in both directions between the outage cellular antenna and the one or more neighboring cellular antennas. The first criteria further includes determining whether the one or more neighboring cellular antennas have a handover success rate (HOSR) of at least 99% and a multi-cell interference (MCI) value of at least 2. The first criteria further includes determining whether the one or more neighboring cellular antennas have an intersite distance greater than zero. The first criteria further includes determining whether the one or more neighboring cellular antennas have an intersection distance greater than zero. The second criteria includes determining whether the one or more neighboring cellular antennas satisfying the first criteria covers a maximum antenna coverage distance. The second criteria further includes determining whether the one or more neighboring cellular antennas satisfying the first criteria have a minimum value for mobility robustness optimization (MRO). The issuing of the instruction to up-tilt the at least one of the one or more neighboring cellular antennas satisfying the second criteria includes an initial two-step up-tilt of at least 2 degrees, and issuing additional instructions to continue up-tilting until a configured interference tolerance is reached. The system includes issuing an instruction, based on the cellular antenna becoming operational, to down-tilt the at least one of the one or more neighboring cellular antennas satisfying the second criteria to original tilt values. Implementations of the described techniques include hardware, a method or process, or computer software on a computer-accessible medium.

Some embodiments include a non-transitory computer-readable storage medium. The non-transitory computer-readable storage medium also includes detecting a service outage at a cellular antenna that creates a coverage hole. The medium also includes determining, in response to the service outage, one or more neighboring cellular antennas to the cellular antenna that are capable of providing cellular coverage for at least a portion of the coverage hole based upon performance metrics for each of the one or more neighboring cellular antennas. The medium also includes issuing instructions, to the one or more neighboring cellular antennas determined capable of providing cellular coverage to the coverage hole based upon the performance metrics, to up-tilt the one or more neighboring cellular antennas determined capable of providing cellular coverage to the coverage hole. Other embodiments of this aspect include corresponding computer systems, apparatus, and computer programs recorded on one or more computer storage devices, each configured to perform the actions of the methods.

Some implementations include one or more of the following features. The non-transitory computer-readable storage medium where acceptable performance metrics are determined through executable instructions that, when executed by a processor, facilitate performance of operations, includes: determining the one or more neighboring cellular antennas are reported in at least one measurement report (MR) in both directions between the cellular antenna and the one or more neighboring cellular antennas; determining the one or more neighboring cellular antennas have a handover success rate of at least 99% (HOSR) and a minimum multi-cell interference (MCI) of at least 2; determining if the one or more neighboring cellular antennas have an intersite distance greater than zero; and determining if the one or more neighboring cellular antennas have an intersection distance greater than zero. Acceptable performance metrics are determined through executable instructions that, when executed by a processor, facilitate performance of operations, including: selecting from the one or more neighboring cellular antennas at least one of the one or more neighboring cellular antennas having the largest distance between the outage cellular antenna and the one or more neighboring cellular antennas and at least two or more users. Implementations of the described techniques include hardware, a method or process, or computer software on a computer-accessible medium.

In some embodiments, a method includes detecting, by a system including a processor and a memory connected to the processor, where the memory is configured to store executable instructions that, when executed by the processor, facilitate performance of operations, a non-operational cellular antenna. The method also includes determining, in response to the non-operational cellular antenna, one or more neighboring cellular antennas configured to provide coverage of a coverage hole caused by the non-operational cellular antenna. The method also includes determining, in response to there being one or more neighboring cellular antennas, at least one of the one or more neighboring cellular antennas to up-tilt the at least one of the one or more neighboring cellular antennas based upon performance metrics recorded at the non-operational cellular antenna. Other embodiments of this aspect include corresponding computer systems, apparatus, and computer programs recorded on one or more computer storage devices, each configured to perform the actions of the methods.

Some implementations include one or more of the following features. The method includes determining, based on the performance metrics, the at least one of the one or more neighboring cellular antennas has at least one user on the at least one of the one or more neighboring cellular antennas. The determining the at least one antenna or the one or more neighboring cellular antennas to up-tilt includes: determining the one or more neighboring cellular antennas are reported in at least one measurement report (MR) in both directions between the cellular antenna and the one or more neighboring cellular antennas, determining the one or more neighboring cellular antennas have a handover success rate (HOSR) of at least 99%, determining if the one or more neighboring cellular antennas have an intersite distance greater than zero, and determining if the one or more neighboring cellular antennas have an intersection distance greater than zero. The determining the at least one antenna of the one or more neighboring cellular antennas to up-tilt includes: determining a maximum antenna coverage distance between the one or more neighboring cellular antennas and the non-operational cellular antenna, and determining the one or more neighboring cellular, antennas having a largest value for mobility robustness optimization (MRO). The method includes issuing an instruction to further up-tilt the at least one of the one or more neighboring antennas to a configured interference tolerance. The method includes storing an original tilt value of the at least one of the one or more neighboring antennas before the at least one of the one or more neighboring antennas is up-tilted. The method includes issuing an instruction, based upon the non-operational cellular antenna being operational, to return the up-tilted cellular antenna to the original tilt value. Implementations of the described techniques include hardware, a method or process, or computer software on a computer-accessible medium.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A system, comprising:
    a processor; and
    a memory connected to the processor, wherein the memory is configured to store executable instructions that, when executed by the processor, facilitate performance of operations, comprising:
        detecting an existing outage associated with devices of a cellular antenna, wherein the existing outage defines an existing cellular coverage hole;
        determining, in response to detecting the existing outage, one or more neighboring cellular antennas to the cellular antenna with the existing outage that are able to be up-tilted to provide coverage to the existing cellular coverage hole based upon the one or more neighboring cellular antennas satisfying a first criteria;
        determining from the one or more neighboring cellular antennas satisfying the first criteria a subset of the one or more neighboring cellular antennas that satisfy a second criteria; and
        issuing an instruction to the subset of the one or more neighboring cellular antennas satisfying the second criteria to up-tilt at least one of the subset of the one or more neighboring cellular antennas satisfying the second criteria to provide coverage to the existing cellular coverage hole.

2. The system of claim 1 wherein the first criteria includes the one or more neighboring cellular antennas having at least one measurement report (MR).

3. The system of claim 2 wherein the first criteria further includes the one or more neighboring cellular antennas having a handover success rate (HOSR) of at least 99% and a multi-cell interference (MCI) value of at least 2.

4. The system of claim 3 wherein first criteria further includes the one or more neighboring cellular antennas having an intersite distance greater than zero.

5. The system of claim 4 wherein first criteria further includes the one or more neighboring cellular antennas having an intersection distance greater than zero.

6. The system of claim 1 wherein the second criteria includes the subset of the one or more neighboring cellular antennas satisfying the first criteria covering a maximum antenna coverage distance.

7. The system of claim 6 wherein the second criteria further includes the subset of the one or more neighboring cellular antennas satisfying the first criteria having a minimum value for mobility robustness optimization (MRO).

8. The system of claim 1 wherein the processor is further configured to issue the instruction to the subset of the one or more neighboring cellular antennas satisfying the second criteria to up-tilt the at least one of the subset of the one or more neighboring cellular antennas satisfying the second criteria to provide coverage to the existing cellular coverage hole by issuing the instruction to perform an initial two-step up-tilt of at least 2 degrees to the at least one of the subset of the one or more neighboring cellular antennas to provide coverage to the existing cellular coverage hole; and
    issuing additional instructions to the at least one of the subset of the one or more neighboring cellular antennas satisfying the second criteria to continue up-tilting the at least one of the subset of the one or more neighboring cellular antennas until a configured interference tolerance is reached.

9. The system of claim 1, wherein the processor is further configured to issue the instruction, based on the cellular antenna becoming operational to restore coverage to the previously existing cellular coverage hole, to down-tilt the at least one of the subset of the one or more neighboring cellular antennas satisfying the second criteria to original tilt values.

10. A non-transitory computer-readable storage medium, comprising executable instructions that, when executed by a processor, facilitate performance of operations, comprising:
    detecting an existing service outage associated with devices of a cellular antenna that creates an existing cellular coverage hole;
    determining, in response to the existing service outage, one or more neighboring cellular antennas to the cellular antenna with the existing service outage that are able to be up-tilted to provide cellular coverage for at least a portion of the existing cellular coverage hole based upon performance metrics for the one or more neighboring cellular antennas satisfying a first criteria;
    determining from the performance metrics for the one or more neighboring cellular antennas satisfying the first criteria a subset of the one or more neighboring cellular antennas that satisfy a second criteria; and
    issuing instructions, to the subset of the one or more neighboring cellular antennas having the performance metrics satisfying the second criteria to up-tilt at least one of the subset of the one or more neighboring cellular antennas satisfying the second criteria to provide coverage for the at least a portion of the existing cellular coverage hole.

11. The non-transitory computer-readable storage medium of claim 10, wherein the performance metrics are determined through executable instructions that, when executed by a processor, facilitate performance of operations, comprising:
    determining the one or more neighboring cellular antennas are reported in at least one measurement report (MR);
    determining the one or more neighboring cellular antennas have a handover success rate of at least 99% (HOSR) and a minimum multi-cell interference (MCI) of at least 5;
    determining the one or more neighboring cellular antennas have an intersite distance greater than zero; and
    determining the one or more neighboring cellular antennas have an intersection distance greater than zero.

12. The non-transitory computer-readable storage medium of claim 11, wherein the performance metrics are determined through executable instructions that, when executed by a processor, facilitate performance of operations, comprising:
    selecting, from the one or more neighboring cellular antennas, at least one of the one or more neighboring cellular antennas that has a substantially large distance between the cellular antenna associated with the existing service outage and the one or more neighboring cellular antennas and at least two or more users.

13. A method, comprising:
    detecting an existing service outage associated with devices of a cellular antenna that creates an existing cellular coverage hole;
    determining, in response to the existing service outage, one or more neighboring cellular antennas to the cellular antenna with the existing service outage that are able to be up-tilted to provide cellular coverage for at least a portion of the existing coverage cellular hole caused by the non-operational cellular antenna based upon performance metrics of the one or more neighboring cellular antennas satisfying a first criteria;
    determining from the one or more neighboring cellular antennas satisfying the first criteria a subset of the one of more neighboring cellular antennas having performance metrics that satisfy a second criteria; and
    issuing instructions, to the subset of the one or more neighboring cellular antennas having performance metrics satisfying the second criteria to up-tilt at least one of the subset of the one or more neighboring cellular antennas having performance metrics satisfying the second criteria to provide coverage for the at least a portion of the existing cellular coverage hole.

14. The method of claim 13, further comprising determining, based on the performance metrics satisfying the first criteria, the one of more neighboring cellular antennas able to be up-tilted has at least one user on the at least one of the one or more neighboring cellular antennas.

15. The method of claim 13, wherein the determining the one or more neighboring cellular antennas able to be up-tilted includes:
    determining the one or more neighboring cellular antennas able to be up-tilted are reported in at least one measurement report (MR) in both directions between the cellular antenna and the one or more neighboring cellular antennas;
    determining the one or more neighboring cellular antennas able to be up-tilted have a handover success rate (HOSR) of at least 99%;
    determining the one or more neighboring cellular antennas able to be up-tilted have an intersite distance greater than zero; and
    determining the one or more neighboring cellular antennas able to be up-tilted have an intersection distance greater than zero.

16. The method of claim 15, wherein the determining from the one or more neighboring cellular antennas satisfying the first criteria the subset of the one or more neighboring cellular antennas having performance metrics that satisfy a second criteria includes:
    determining a maximum antenna coverage distance between the subset of the one or more neighboring cellular antennas having performance metrics that satisfy a second criteria and the non-operational cellular antenna; and
    determining the subset of the one or more neighboring cellular antennas having performance metrics that satisfy a second criteria that have an acceptable mobility robustness optimization (MRO) value.

17. The method of claim 13 further comprising issuing an instruction to further up-tilt the subset of the one or more neighboring antennas having performance metrics that satisfy a second criteria to a configured interference tolerance.

18. The method of claim 13 further comprising storing an original tilt value of the subset of the one or more neighboring antennas having performance metrics that satisfy a second criteria before the subset of the one or more neighboring antennas are up-tilted.

19. The method of claim 18 further comprising issuing an instruction, based upon the non-operational cellular antenna becoming operational, to return the subset of the one or more neighboring antennas to the original tilt value.

20. The method of claim 19 further comprising issuing an instruction to the operational cellular antenna to begin radio transmissions once the subset of the one or more neighboring antennas return to the original tilt value.

* * * * *